Sept. 30, 1924.
F. SCHAEFER
ARTICULATED BRAKE HANGER
Filed May 31, 1923
1,509,907
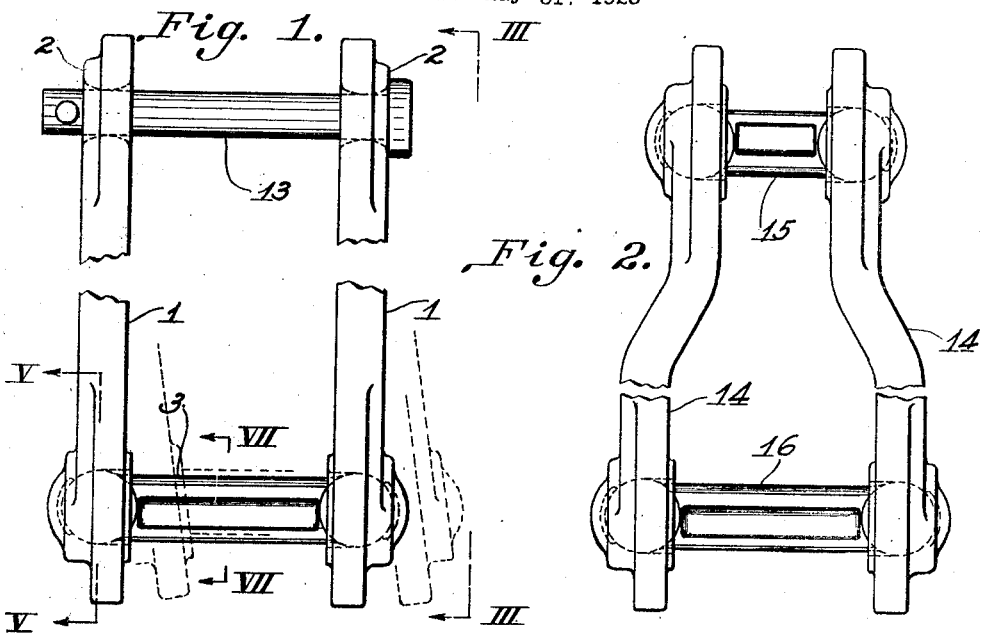
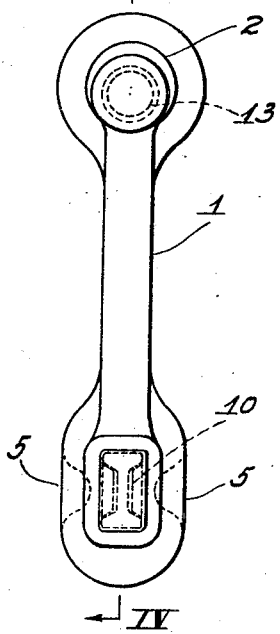
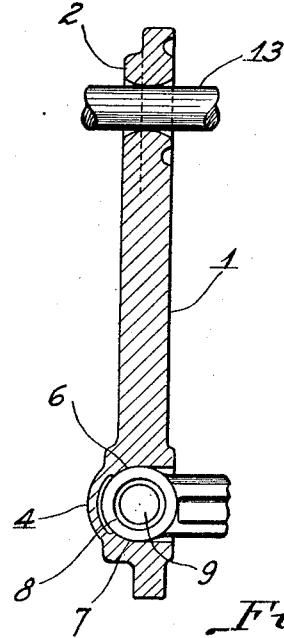
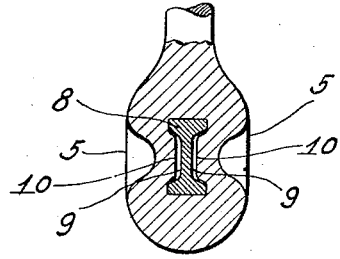
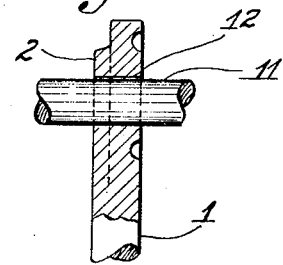
WITNESSES
A. B. Wallace
INVENTOR
Frederic Schaefer,
by Winter & Brown,
his attorneys.

Patented Sept. 30, 1924.

1,509,907

UNITED STATES PATENT OFFICE.

FREDERIC SCHAEFER, OF PITTSBURGH, PENNSYLVANIA.

ARTICULATED BRAKE HANGER.

Application filed May 31, 1923. Serial No. 642,464.

*To all whom it may concern:*

Be it known that I, FREDERIC SCHAEFER, a citizen of the United States, and a resident of Pittsburgh, in the county of Allegheny and State of Pennsylvania, have invented a new and useful Improvement in Articulated Brake Hangers, of which the following is a specification.

The invention relates to hangers for suspending brakes from the trucks of railway cars, coaches and the like.

As ordinarily constructed, brake hangers are either closed links in which upper and lower horizontal yokes are formed integrally with side arms which connect the yokes to each other, or they are U-shaped, or substantially so, in which a lower yoke is formed integrally with the lower ends of side arms and the upper ends of the side arms are provided with eyes for receiving pins to connect the hangers to truck frames.

In use, both types are subjected to considerable lateral strains in the general planes of their constituent elements. This arises from the lateral swaying of cars, and is accentuated by loose connections, wear on the axle-bearing brasses, and wear on other parts, all of which contribute to permitting lateral movements between the car wheels and the truck frames from the latter of which the brake hangers are suspended. As ordinarily constructed, brake hangers are designed, or intended to be, with sufficient metal in their parts to resist these lateral strains, but nevertheless they occasionally break and permit their supported brake beams to fall in front of car wheels in positions to cause derailment.

To overcome this inherent weakness in brake hangers, it has been proposed to form their side arms of resilient metal so shaped that they may bend to permit the lower yokes to swing laterally with respect to the upper yokes. This, however, has not met with satisfaction, nor has it eliminated breakage of the brake hangers. The resilient brake hangers are more expensive to manufacture than the ordinary rigid ones, and ultimately the resilient metal of which they are made crystallizes due to the continual lateral swinging movements, and the hangers break the same as do the non-resilient hangers. It has also been proposed to pivotally connect the side arms to the yokes by means of supplemental pins or bolts and nuts. This, too, is objectionable, because of the lack of permanent security of the connections thus formed and of the additional expense of manufacture.

The object of this invention is to provide brake hangers which may be economically manufactured, and which are so constructed that the lateral forces applied to them in service will not result in subjecting their parts to breaking strains.

To accomplish this object, I provide an articulated brake hanger, that is to say a brake hanger in which the yoke, or yokes, and the side arms are pivotally connected to each other in such a manner as to permit the brake hanger to swing laterally in the general plane of its constituent parts, that is to say in the general plane of its yoke, or yokes, and side arms. The invention is applicable to both the closed link and the U-shaped type of hangers. As will be presently explained more in detail, brake hangers embodying the invention are preferably so formed that their yokes and side arms may be forged, and that the pivotal connections of the yokes and side arms to each other may be effected without the use of supplemental pivot pins.

The invention is illustrated in the accompanying drawings of which Fig. 1 is an elevation of a U-shaped brake hanger; Fig. 2 an elevation of a closed link brake hanger; Fig. 3 a side view of an arm of the brake hanger of Fig. 1; Fig. 4 a vertical sectional view taken on the line IV—IV, Fig. 3; Fig. 5 a vertical sectional view of the lower end of a side arm of the brake hanger of Fig. 1, the plane of view being indicated by the line V—V, Fig. 1; Fig. 6 a vertical sectional view of the upper end of the arm of the brake hanger of Fig. 1 showing a modification of construction; and Fig. 7 a sectional view of a yoke, the plane of view being indicated by the line VII—VII, Fig. 1.

Having reference first to the U-shaped brake hanger illustrated in Fig. 1, it comprises vertical arms 1 having pin-receiving eyes 2 at their upper ends, and a lower yoke 3 which, in cross section, may be an asymmetric I-beam as disclosed and claimed in my Patent No. 1,470,121, issued October 9, 1923. It will be understood, however, that yokes having different cross-sections may be used.

In pivotally attaching a yoke to a side arm, the end of one of these members is preferably provided with a socket and the end of the other member with a bearing head mounted in the socket. Preferably the socket is formed in the side arm and the head on the end of the yoke. The socket may be formed by a back wall 4, side walls 5 and upper and lower bearing walls 6 and 7, and, shown in Figs. 4 and 5, is preferably substantially semi-cylindrical. The head 8 at the end of yoke 3 is preferably of cylindrical form adapted to bear on the upper and lower socket walls 6 and 7, back wall 4 of the socket being off-set in the manner indicated in Fig. 4 to minimize frictional resistance.

To hold the head in the socket, the side walls of the head are preferably provided with cup-shaped recesses 9 and the side walls 5 of the socket are pressed inwardly to form buttons 10 lying in the recesses 9. By this manner of connecting the yoke to the arm the load of the yoke, whether it be acting upwardly or downwardly, is transmitted to side arms 1 directly through upper and lower bearing walls 6 and 7 of the socket, and no shearing strain due to the load carried by the yoke is transmitted through the buttons 10. The buttons serve merely to prevent separation of the yoke from the arm.

In Fig. 1 the side arms 1 and yoke 2 are indicated in full lines in their normal relative positions and in dotted lines when the yoke is swung laterally in the general plane of the side arms and yoke. To permit such swinging in hangers of the U-shaped type, connecting pins 11 may be, as indicated in Fig. 6, of smaller diameter than the bore 12 of the eye 2 when the bore is cylindrical, or the bore of the eye may be curved in the general manner indicated in Fig. 4. In the latter case connecting pin 13 may be of substantially the same diameter as the minimum cross-section of the bore through the eye.

In forming a closed-link brake hanger the side arms 14 may, as shown in Fig. 2, have both of their ends provided with sockets of the same construction as explained with reference to the U-shaped hanger of Fig. 1, and both the upper and lower yokes 15 and 16 may have their ends provided with bearing heads the same as the ends of lower yoke 3 of Fig. 1. By thus connecting the upper and lower yokes to the side arms, the brake hanger may swing laterally freely. In the closed link brake hanger upper yoke 15 is indicated as being shorter than lower yoke 16, and side arms 14 are off-set inwardly in the manner indicated. It will be understood, however, that the side arms of the closed link brake hanger may be straight, as are the side arms of the U-shaped hanger of Fig. 1, and that the arms of the U-shaped hanger may be off-set as are those of the closed link type.

While both types of brake hangers may be variously manufactured, it is preferred to make them by forging operations. Each side arm may be formed from a rod by first upsetting its ends to form enlargements on it and then forging the enlargements to form a socket at one end and an eye at the other in the case of the U-shaped hanger, or sockets at both ends in the case of a closed link hanger. Each yoke may also be formed from a rod by first upsetting its ends to form enlargements on it and then forging the upset rod to form bearing heads at its ends and the irregular configuration of its intermediate portion. With the socket ends of the side arms sufficiently heated to permit their sides walls 5 to be pressed inwardly to form buttons 10, the ends of the yokes may be placed in the sockets and the buttons thus formed. This completes the construction of the brake hanger. If desired, it may then be heat treated to remove forging strains and to give it the required physical properties.

According to the provisions of the patent statutes, I have described the principle and operation of my invention together with constructions which I now consider to represent the best embodiment thereof. However, I desire to have it understood that, within the scope of the appended claims, the invention may be practiced by other forms of construction than those illustrated and described.

I claim as my invention:

1. An articulated brake hanger comprising as constituent elements a pair of side arms and a yoke, the ends of one of said constituent elements being provided with sockets, and the ends of the other of said elements having bearing heads pivotally mounted in said sockets, each cooperating head and socket being provided with integrally formed interlocked detents cooperating with each other to form the sole means of connecting the yoke to the side arms.

2. An articulated brake hanger comprising side arms having their lower ends provided with sockets, and a lower yoke having its ends provided with bearing heads pivotally mounted in said sockets, each cooperating head and socket being provided with integrally formed interlocked detents cooperating with each other to form the sole means for connecting the yoke to the side arms.

3. An articulated brake hanger comprising as constituent elements side arms and a yoke, the ends of one of said constituent elements being provided with sockets, and the ends of the other of said elements having bearing heads pivotally mounted in said sockets, said heads having recesses in their sides, and the side walls of said sockets being provided with projections extending inwardly into said recesses to lock said elements in their pivotal connections to each other.

4. An articulated brake hanger comprising side arms provided at their lower ends with sockets, and a lower yoke provided at its ends with heads pivotally mounted in said sockets, said heads having cup-shaped recesses in their sides, and the side walls of said sockets being provided integrally with buttons projecting inwardly into said recesses to lock said yoke and side arms in their pivotal connections to each other.

5. An articulated brake hanger comprising side arms provided at their lower ends with sockets having cylindrically shaped bearing walls, and a lower yoke provided at its ends with cylindrically shaped bearing heads pivotally mounted in said sockets, said heads having cup-shaped recesses in their sides, and the side walls of said sockets being integrally provided with buttons extending in said recesses to lock said yoke and side arms in their pivotal connections to each other.

6. The method of manufacturing an articulated brake hanger having side arms and a yoke, which comprises forging the side arms with sockets in their lower ends, forging the yoke with bearing heads on its ends and recesses in the sides of said heads, placing the heads of the yoke in the sockets of said arms, and pressing the side walls of said sockets into said recesses in said heads to lock the yoke and side arms in their pivotal connections to each other.

In testimony whereof, I sign my name.

FREDERIC SCHAEFER.

Witness:
EDWIN O. JOHNS.